May 6, 1958  V. E. CARBONARA ET AL  2,833,629
CARBON MONOXIDE INDICATOR
Filed Sept. 17, 1953  7 Sheets-Sheet 1

INVENTORS
VICTOR E. CARBONARA
NATHAN KAPLAN
GERARD SPILLER
MICHAEL WENSRYN
BY Ostrolenk & Faber
ATTORNEYS May 6, 1958 V. E. CARBONARA ET AL 2,833,629
CARBON MONOXIDE INDICATOR
Filed Sept. 17, 1953 7 Sheets-Sheet 2
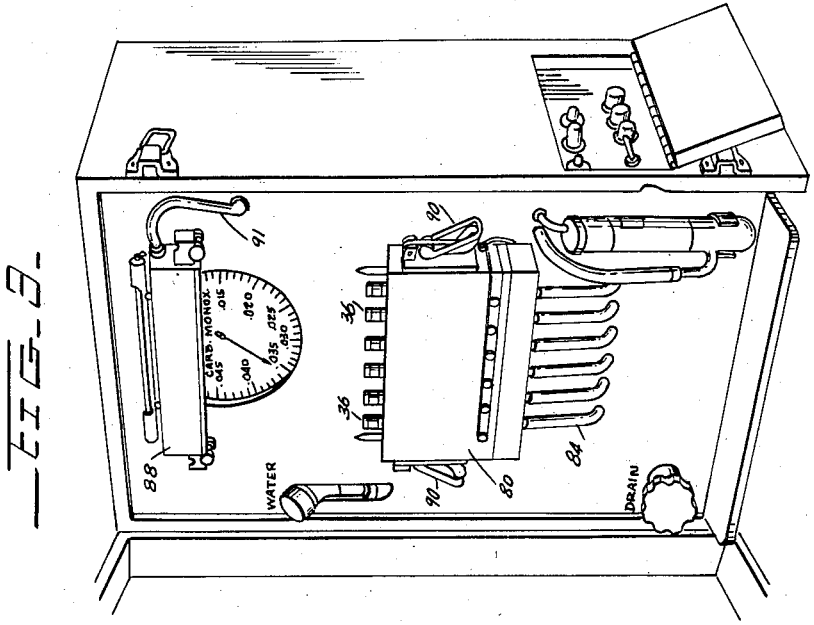
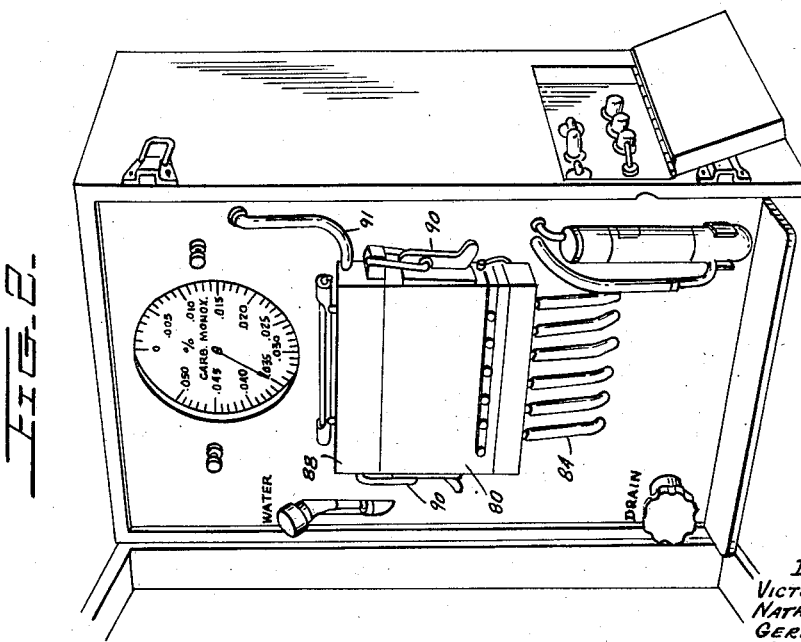
INVENTORS
VICTOR E. CARBONARA
NATHAN KAPLAN
GERARD SPILLER
MICHAEL WENGRYN
BY
Ostrolenk + Faber
ATTORNEYS

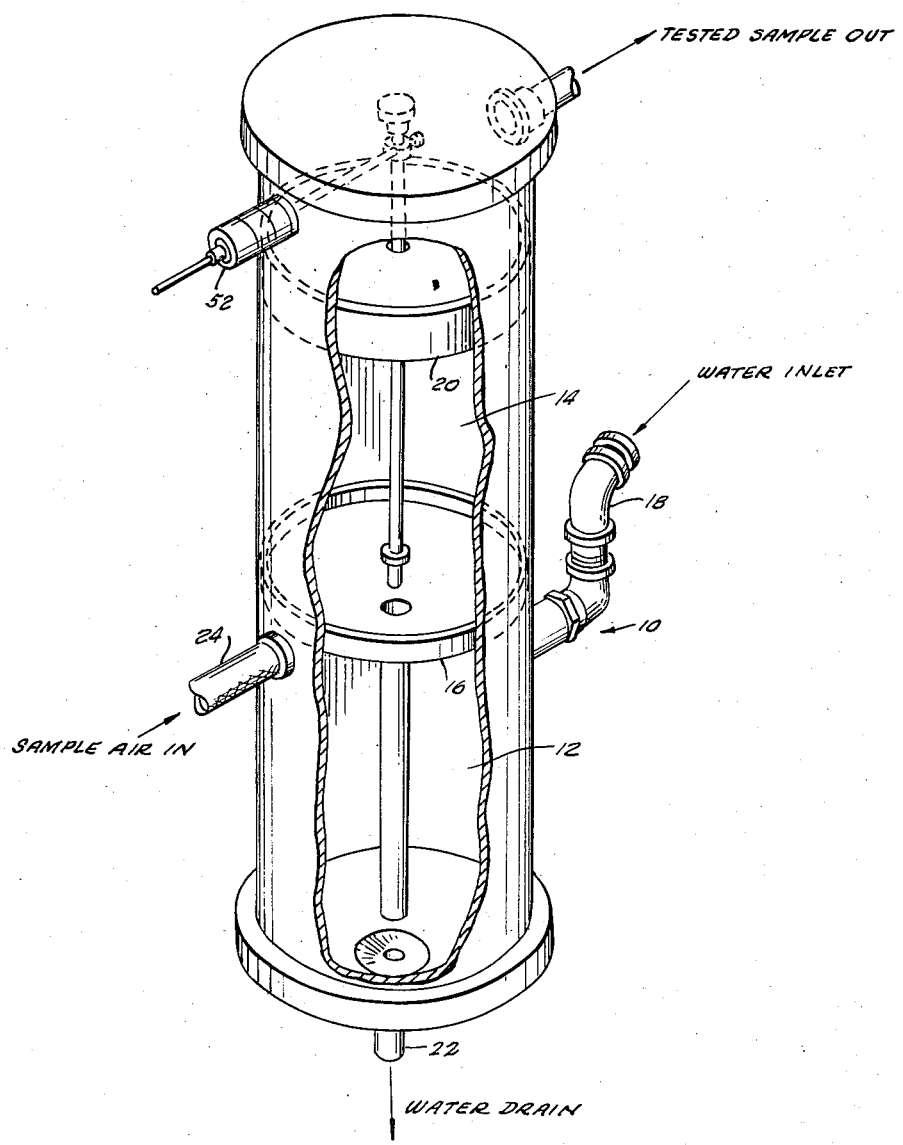

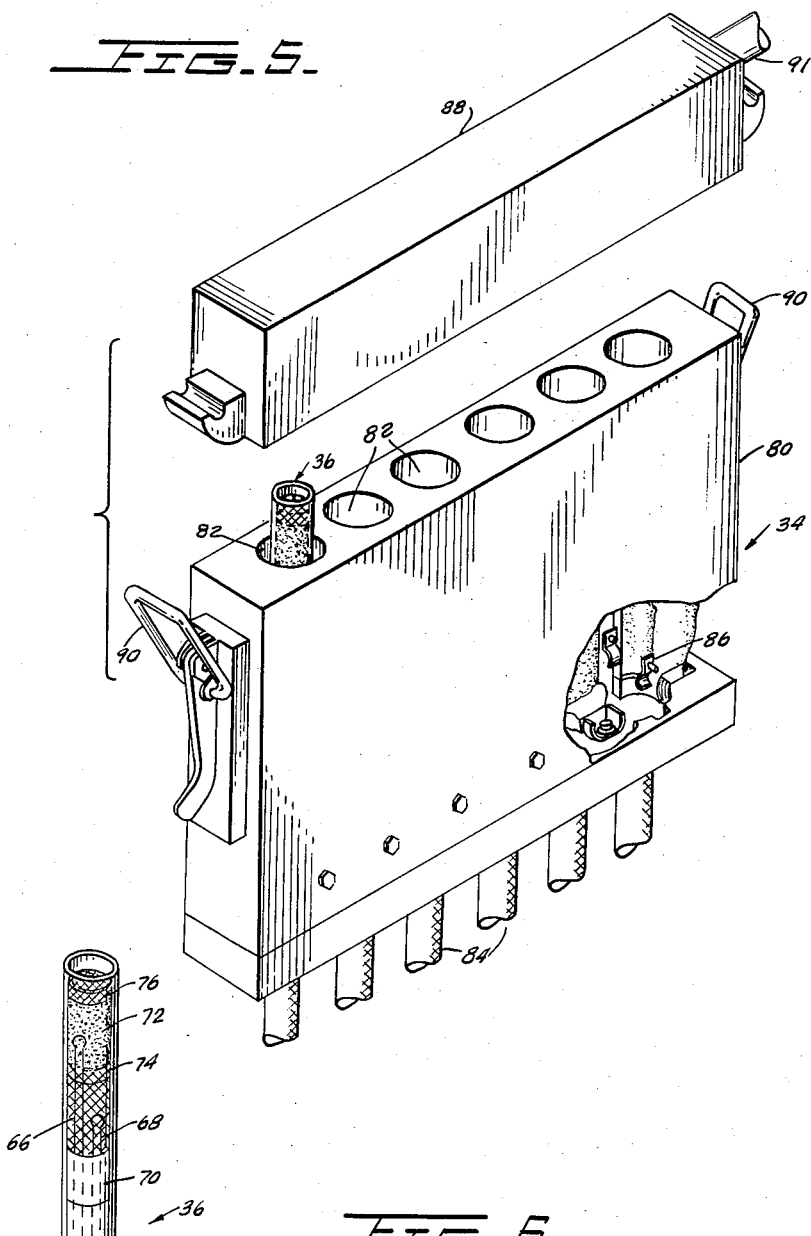
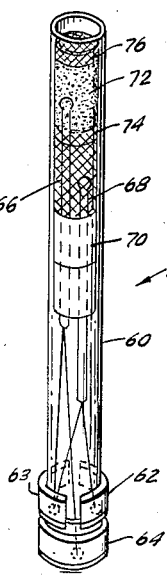

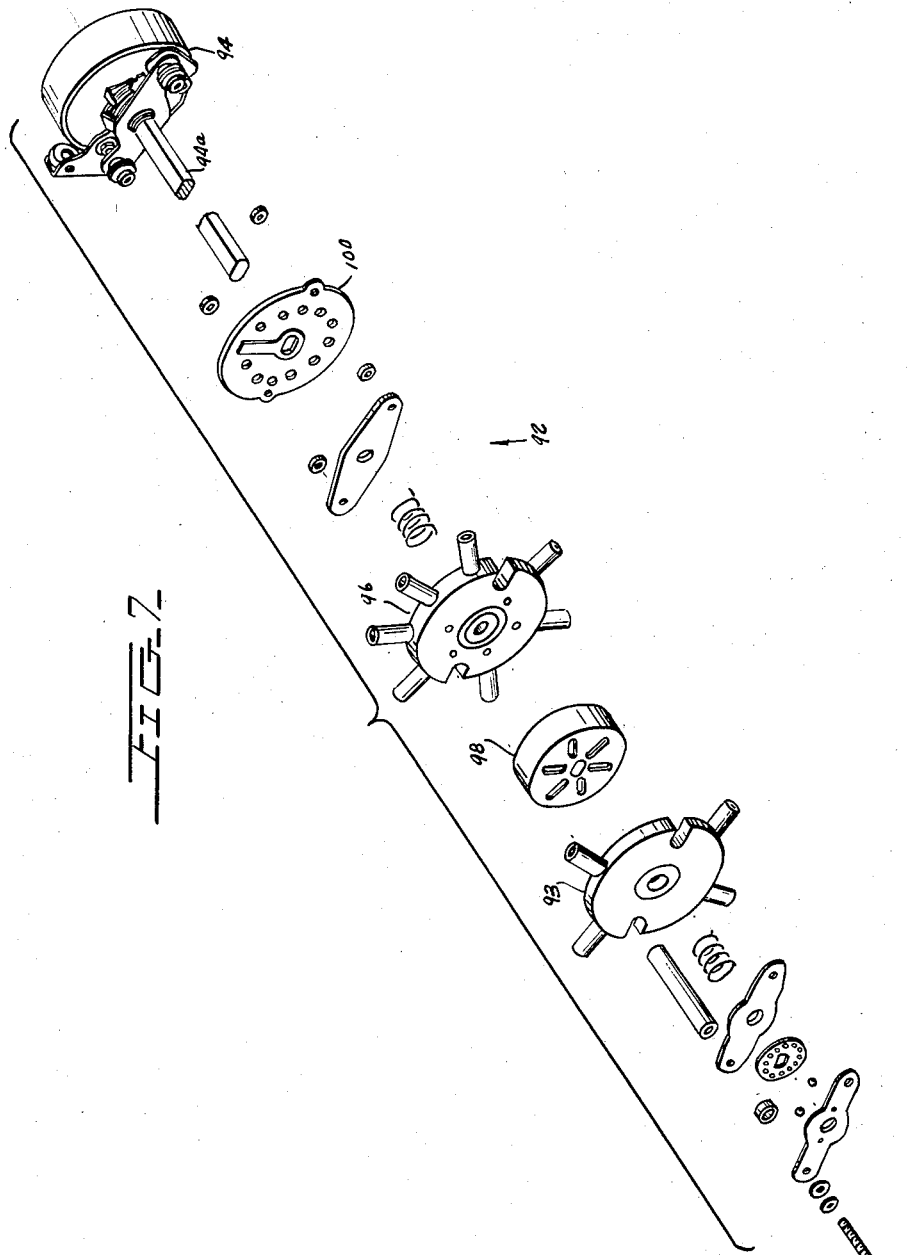

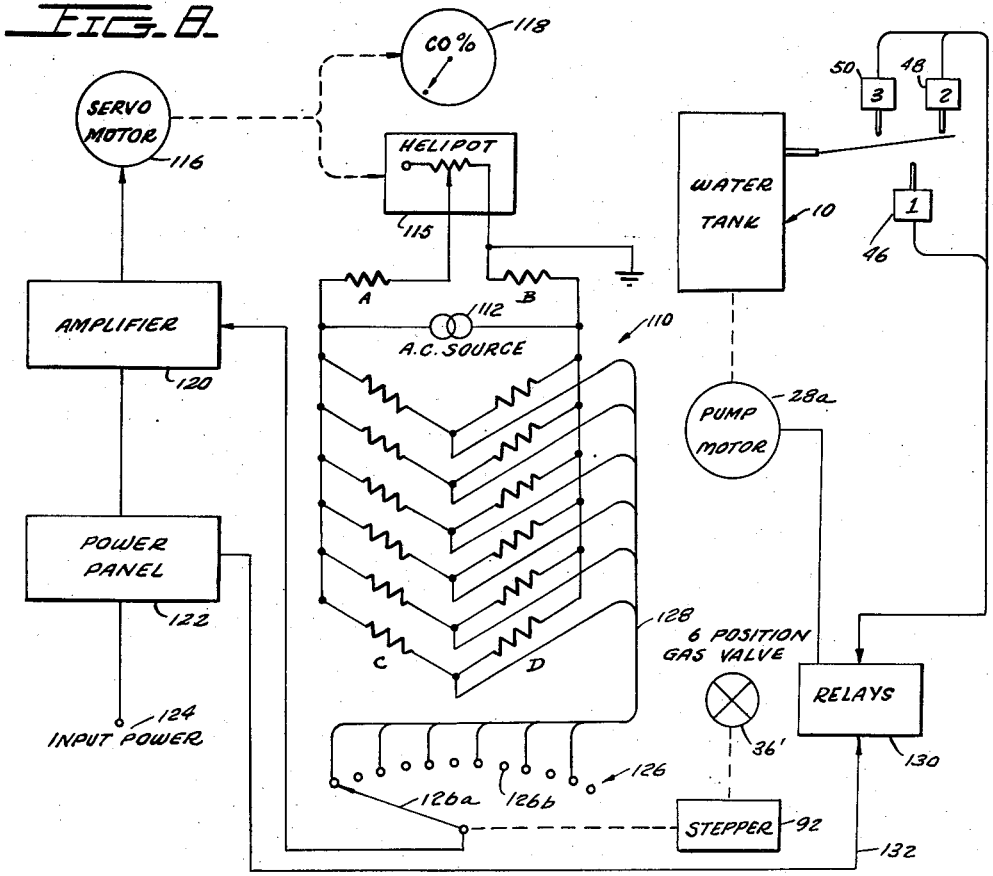
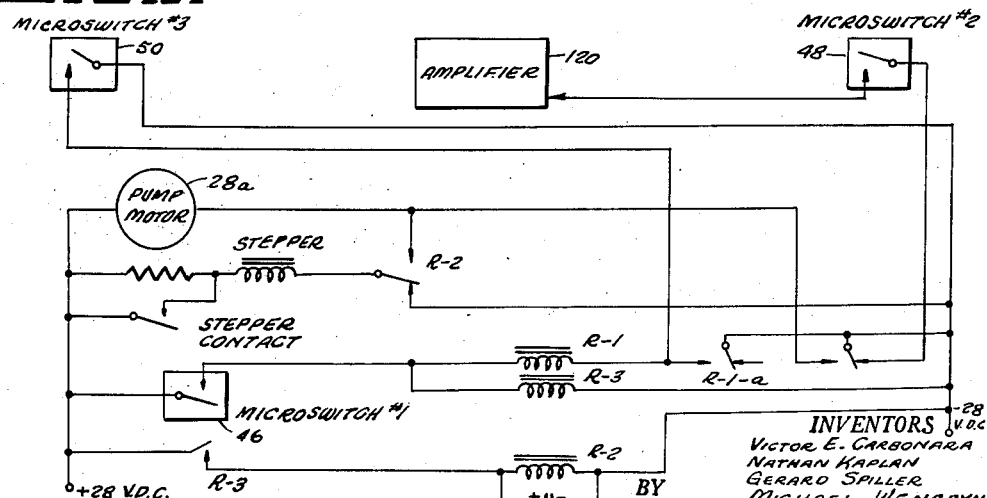

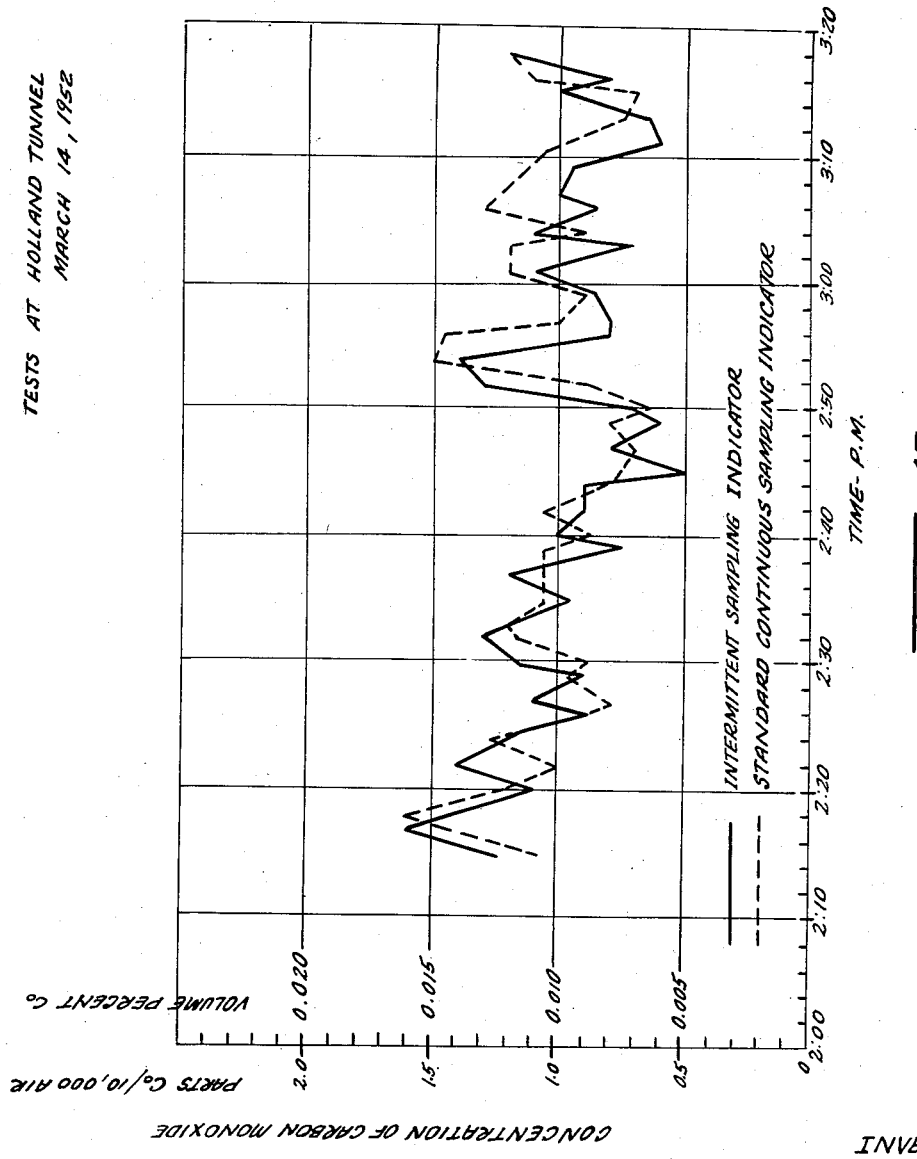

United States Patent Office 2,833,629
Patented May 6, 1958

2,833,629

CARBON MONOXIDE INDICATOR

Victor E. Carbonara, Manhasset, Nathan Kaplan, Belle Harbor, Gerard Spiller, Elmhurst, and Michael Wengryn, Bellerose, N. Y., assignors to Kollsman Instrument Corporation, Elmhurst, N. Y., a corporation of New York Application September 17, 1953, Serial No. 380,792

9 Claims. (Cl. 23—254)

The present invention relates to carbon monoxide indicators and particularly to indicators of the thermometric type arranged to promote room temperature oxidation of carbon monoxide and to utilize the resultant temperature rise for indicating the percent carbon monoxide.

A number of operational requirements are imposed upon equipment for detecting the presence of toxic quantities of carbon monoxide, among them high sensitivity to enable detection of minute percentages of carbon monoxide in the air; reliability under changing conditions such as in ambient temperature and pressure; rapid response to sudden or large changes in the quantity of carbon monoxide being detected; accuracy under actual operating conditions in determination of large or small quantities of carbon monoxide; and simplicity and foolproofness in operation.

Accordingly, it is an object of the present invention to provide a novel carbon monoxide indicator incorporating one or more of the aforesaid desirable features. More specifically, it is within the contemplation of the present invention to provide a carbon monoxide indicator which is highly sensitive, rapid to respond, accurate in measuring, independent of changes in ambient temperature, and operable for relatively long periods without servicing or inspection.

In analysis of air and other gaseous atmospheres, resort has been made to continuous catalytic oxidation for the purposes of determining the presence and amounts of carbon monoxide. Catalysts heretofore used for oxidizing the carbon monoxide have been found to be highly sensitive to water vapor, thus necessitating the removal of moisture from the atmospheric sample for successful thermometric detection of the presence of carbon monoxide. The disadvantages of this technique are apparent, especially when considering the rigid requirements of sensitivity and accuracy usually imposed for successful commercial application of this type of detector.

Accordingly, it is a further object of the present invention to provide a catalyst type indicator for thermometric detection of carbon monoxide which does not necessitate complete removal of moisture from the sample under test.

It is a still further object of the present invention to provide a thermometric type carbon monoxide indicator which is capable of operating for prolonged periods without replacement of or addition to the oxidizing catalyst.

More specifically, in accordance with this aspect, an intermittently operable thermometric indicator is provided in which the catalyst is not under constant exposure to the sample under test, thereby resulting in a somewhat longer active life for the catalyst as compared to continuously operating detectors or indicators.

The above objects and still further features and advantages of the present invention will become apparent upon reference to the following detailed description of an illustrative embodiment when taken in conjunction with the drawings wherein:

Figure 2 is a perspective view of the carbon monoxide indicator of Figure 1 illustrated as a compact unit with the bank of catalyst-thermistor reaction tubes shown below an indicator face.

Figure 3 is a perspective view similar to Figure 2 with the head of the catalyst-thermistor bank removed to expose the upper ends of the reaction tubes.

Figure 4 is a perspective view, with parts broken away and sectioned, of the air sampling reservoir shown in Figure 1.

Figure 5 is an exploded perspective view, with parts broken away, of the catalyst-thermistor reaction bank seen in Figures 1 to 3, inclusive.

Figure 6 is a perspective view of a single reaction tube constructed in accordance with the present invention.

Figure 7 is an exploded perspective view of a solenoid valve and switching device forming part of the electrical control system of the present invention.

Figure 8 is a schematic of the electrical control system for the carbon monoxide indicator of the present invention.

Figure 9 is a schematic of the relay circuit for obtaining the sequential and intermittent operation of the carbon monoxide indicator.

Figure 10 is a chart showing comparative test results between an intermittently operated indicator constructed in accordance with the present invention and a standard continuously operated indicator.

Figure 1:
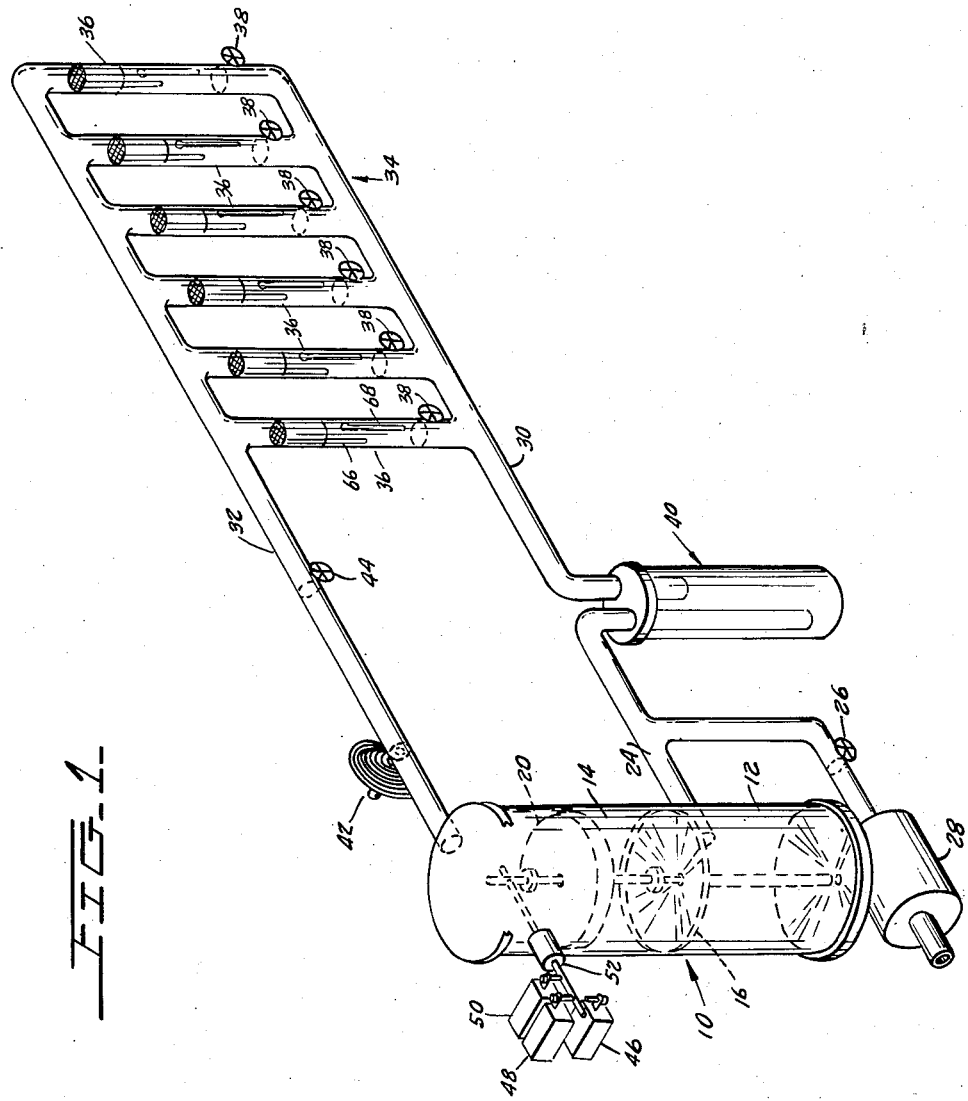
Figure 1 is a diagrammatic view showing a carbon monoxide indicator arranged in accordance with features of the present invention.

Referring now specifically to the drawings, there is shown in Figure 1 a carbon monoxide indicator arranged in accordance with the present invention for the intermittent sampling and thermometric detection of the presence of carbon monoxide in air. The indicator includes an air sampling reservoir or tank 10 having a lower compartment 12, an upper compartment 14, and a separating partition 16.

As best seen in Figure 4, the lower compartment 12 can be filled with a driving medium, such as water, from a suitable inlet conduit 18. Arranged within the upper compartment 14 is a float 20 which is displaceable upwardly in response to the flow of water from the lower compartment 12, which is normally filled, into the upper compartment 14. The reservoir or tank 10 is provided with a suitable drain 22 and an air sample inlet 24 which is connected via an appropriate conduit system including a check valve 26 to a diaphragm pump or the like 28. The pump 28 forces a sample of air into the lower compartment 12 thereby displacing the water into the upper compartment 14. The water is periodically allowed to return to the lower compartment 12 and serves to confine, humidify and drive the air sample, as will subsequently become apparent.

Connected in the closed air circulation system which includes the inlet pipe 30 and the return or outlet pipe 32 is a catalyst-thermistor reaction bank 34 which serves to bring about an oxidation of the carbon monoxide in the sample to cause a temperature rise which is evaluated and interpreted as percent carbon monoxide by the thermistors. The catalyst-thermistor bank 34 includes plural reaction tubes 36, to be subsequently described in detail, arranged in tandem and adapted to be intermittently and sequentially connected in the closed air circulating system by opening of the normally closed valves 38 associated with the perspective reaction tubes 36.

Interposed between the air sample reservoir or tank 10 and the catalyst-thermistor bank 34 along the inlet pipe 30 is a conditioning tube 40 which maintains the relative humidity of the air samples derived from the reservoir 10 at an optimum range for the catalyst employed in the bank 34. Specifically, the conditioning tube 40 is filled with glass wool moistened with a saturated solution of calcium nitrate. The conditioning tube is effective to reduce the relative humidity of the sample to a value below 70% and within an optimum range of 50% to 70%.

In order to charge the reservoir 10 with a sample independent of external pressure, a diaphragm actuated valve 42 is arranged in the return pipe or conduit 32 in communication with the upper compartment 14. As the water is forced into the upper compartment or chamber 14, the air ahead of the water is compressed and ultimately released by the diaphragm actuated valve 42 which may be set to open at any absolute pressure, optimally 1.1 atmospheres. The diaphragm actuated pressure release valve 42 is isolated from the catalyst-thermistor bank 34 by a check valve 44 arranged within the return pipe or conduit 32.

Coordination and intercontrol of the check or isolating valves 26, 44, the diaphragm pump 28 for the intake sample, the respective reaction tube valves 38 of the catalyst-thermistor bank 34 and the measuring circuit illustrated as a self-balancing Wheatstone bridge in Figure 8 is accomplished by microswitches 46, 48 and 50 actuated by a switch arm 52 carried by the float 20 in the upper compartment 14 of the air sample reservoir 10.

The sequence of operation will now be described briefly in order to facilitate a general understanding of the operation, a more detailed description of the system being set forth in conjunction with Figures 5 and 6.

When the diaphragm pump 28 operates, a sample of air is pumped into the lower compartment 12 which is normally filled with the driving medium. As the driving medium, specifically water, is forced from the lower compartment or chamber 12 to the upper compartment or chamber 14, the air ahead is compressed and released by the diaphragm actuated valve 42. When the water in the upper chamber 14 has reached a predetermined level, the float switch arm 52 via the microswitches 46, 48, 50 stops the pump 28 and at this instant the air sample to be analyzed is confined in the lower chamber 12 at a pressure independent of the external pressure, the sample being humidified by contact with the water remaining in the walls of the lower compartment 12.

Simultaneous with the stopping of the pump 28 a switching arrangement is brought into operation, opens the check or isolating valves 26, 44, brings the first of the reaction tubes of the bank 34 into the closed air flow system, and switches the temperature responsive impedances of this particular reaction tube into the Wheatstone measuring bridge. The head of water in the upper compartment 14 drives the sample through the conditioning tube 40 and into the connected one of the reaction tubes 36 of the bank 34. During passage of the sample through the conditioning tube the saturated solution of calcium nitrate reduces the humidity to the optimum range.

As the air sample begins to flow through the reaction tube, oxidation of the carbon monoxide raises the temperature and decreases the resistance of the thermistors. After a moderately steady value is reached, which occurs shortly after gas flow is brought about, the microswitch arrangement energizes the measuring bridge. Thus, the measuring bridge is operated only when a steady state condition is reached. Continued flow of the water into the lower chamber, as the air is displaced, causes the float 20 to reach the low point of its travel, at which point the bridge is deenergized, and a relay system operated to connect a successive reaction tube into the system.

Thereafter, the cycle is automatically repeated, it being found that approximately one minute for charging the reservoir with the air sample and one minute for discharging the sample through the analyzing system obtains optimum results. With two-minute intervals between the stepping of the relay system to advance the air flow valves to bring successive reaction tubes into sequence, it has been found that six reaction tubes are sufficient to provide ample time for the catalyst to cool to room temperature between successive samplings with the same reaction tube.

Reference will now be made to Figures 5 and 6 where there are shown the details of the catalyst-thermistor bank 34 and of the respective reaction tubes 36. Each of the reaction tubes 36 includes a length of Pyrex glass tubing or the like 60 provided with contact rings 62, 63, and 64 contiguous to the lower end thereof. Within the tubing 60 are a sensing thermistor 66 and a balancing thermistor 68, the respective thermistors being held in place by stainless steel clamps 70. As seen in Figure 6, the bead of the balancing thermistor 68 is arranged ahead of the bead of the sensing thermistor along the flow path defined by the tube 60. The bead of the sensing thermistor 66 is arranged within a catalyst chamber 72 defined by retaining cups 74, 76 of Monel screen which serve to confine the catalyst granules. The catalyst consists of silver permanganate granules of 20 to 40 mesh size which are not destroyed by the presence of water vapor.

Actually, water vapor is necessary for the satisfactory operation of the silver permanganate catalyst and in the present indicator the conditioning tubes serve to maintain the relative humidity of the sample at the optimum range of 50 to 70% for this catalyst. The arrangement of the individual reaction tubes facilitates the replacement of the catalyst, since the respective reaction tubes, containing the catalyst and thermistors, each may be removed as a unit from the catalyst-thermistor bank of Figure 5 without requiring tools or the like.

The sensing thermistor and the balancing thermistor 68 are a matched pair each preferably with a nominal resistance of 2000 ohms at 25° C. and an approximate thermal coefficient of resistance of minus 4% per degree centigrade. The pairing of the thermistors assures a uniform initial balancing of the Wheatstone measuring bridge circuit, to be described, with the result that the bridge unbalance is caused entirely by catalytic oxidation of the carbon monoxide. The balancing or control thermistor 68, in the free air stream ahead of the catalyst, compensates for small changes in the ambient temperature of the air sample.

It has been found that temperature fluctuations of plus or minus 5° C. have been found to produce no significant change in the performance of the present carbon monoxide indicator. The sensing and balancing thermistors 66, 68 have their respective leads connected to the contact rings 62, 63, 64, the contact ring 63 serving as a common junction between the respective thermistors.

Specific reference will now be made to Figure 5 where there is shown a reaction bank arranged to facilitate replacement of the respective reaction tubes. Specifically, the bank includes a non-conductive block 80 of Bakelite or the like provided with plural side-by-side bores 82 each adapted to receive one of the reaction tubes 36. The lower ends of the bores 82 for the respective tubes 36 are connected by suitable conduits 84 to provide entry passages for introduction of the air sample into the catalyst tubes. In order to make electrical contact with the appropriate contact rings 62, 63, 64 of the reaction tubes 36, there are provided plural contacts 86 positioned to engage the respective rings when the reaction tubes 36 are within the bores 82. The contacts 86 are connected to the bridge circuit in accordance with circuitry which will become apparent upon description of the arrangement of Figures 8 and 9.

Associated with the block or body 80 is a removable head or lid 88 which may be locked in place by clamps 90 and serves to provide pressure tight connection of the respective reaction tubes in the air flow system. Perfect sealing may be facilitated by the provision of O-ring seals at both ends of the reaction tubes 36. Internally of the removable head or lid 88 there is provided a common passageway interconnecting the upper ends of the respective reaction tube 36, this common passageway being connected to an appropriate exit 91 for the tested air.

In Figure 7 there is shown a solenoid valve and switching device arranged to permit necessary gas flow and circuit changes by simply energizing the solenoid thereof. Additionally, this rotary electric switch serves to bring the proper thermistor pairs into the Wheatstone measuring circuit. Specifically, the switching device 92 includes a stepping relay 94 of known construction which makes 12 steps for each revolution, one step being accomplished in response to every energization of the solenoid thereof. The relay includes two stationary valve plates or discs 93, 96 arranged on opposite sides of a rotating double faced selector plate 98. The stationary plates 93, 96 and the selector plate 98 are appropriately grooved on the contact faces thereof to provide for the desired valve operation set forth in detail previously.

Additionally, on the shaft 94a of the stepping relay there is supported an electric switch wafer 100 which effects the switching of the pairs of sensing and cooling thermistors for the respective reaction tubes 36 into the bridge circuit. Since the remaining components of the stepping relay are constructed and arranged in accordance with well understood principles, their detailed description will be omitted in the interests of simplicity.

Reference will now be made to the block diagram of Figure 8 wherein there is shown the general arrangements of the components of the electrical system which effectuate complete automatic operation after the indicator is started by the system of float actuated microswitches operated through relays. The self-balancing Wheatstone bridge, generally designated by the reference numeral 110, which evaluates thermistor resistance changes as percent carbon monoxide includes four legs designated, respectively, by the letters A, B, C and D. The legs A and B are the conventional ratio arms. The leg C is provided by successive ones of the control or compensating thermistors in the air stream ahead of the catalyst. The leg D is provided by successive ones of the sensing thermistors embedded in the catalyst bed of the respective tubes 36.

A suitable source of A. C. current 112 is connected across the opposite terminals of the Wheatstone bridge, a variable balancing impedance 115 being connected in series with the ratio arm A. The bridge 110 is of conventional construction and is self-balanced by a servo-motor 116 which is ganged to the shafts of the potentiometer 114 and to the shaft of an indicator 48. Accordingly, as the servo-motor balances the bridge via the impedance 114, the requisite change to effectuate balancing is recorded on the indicator 118 as percent carbon monoxide. The servo-motor is controlled from the bridge 110 by an amplifier 120 which is energized from a power panel 122 connected to an appropriate source of input power 124.

Switching of the appropriate pair of thermistor arms C, D into the bridge circuit is accomplished by the rotary switch 126 which includes a switch arm 126a and plural contacts 126b connected to a common lead 128 which is tied to the junctions of the legs C and D as seen in Figure 8. The mechanical counterpart of this junction is the contact ring 63 of the reaction tube 36. The rotary switch 126 is controlled from the stepper 92 described in conjunction with Figure 7, this stepper likewise serving to open the appropriate one of the valves 38 of the reaction tubes, the valves being illustrated as a single six-position gas valve 36' in Figure 8.

The relay system, generally designated by the reference numeral 130 which will be described in conjunction with Figure 9, is controlled by the microswitches 46, 48, 50 and derives its power from the input power source 124 via the lead 132. It is to be observed that the microswitches via the relay system 130 control the pump motor 28a which feeds the water into the lower compartment of the water tank 10.

Generally the system of Figure 8 operates as follows: When an appropriate pair of sensing and compensating thermistors are connected in the bridge circuit 110, the servo-motor 116 via an appropriate gear train drives the helipot or potentiometer 114 to the position of bridge balance which yields an indication as a change in position of the pointer of the carbon monoxide meter 118 which is attached directly to the shaft of the potentiometer. After the solenoid operated rotary switch 126 brings the appropriate thermistor pair into the bridge circuit, the bridge is energized.

Energization of the bridge occurs only during the last interval of the gas flow cycle assuring that the thermistors have attained a fairly steady state condition prior to measurement of carbon monoxide content.

Reference will now be made to Figure 9 wherein there is shown the interconnection of the relays 130 and the microswitches for effectuating sequential control. When power is applied to the system, relay R–1 operates through the microswitches 46, 50 and locks in through its own contacts R–1–a. The energization circuit for the coil of relay R–1 is from the positive side of the direct voltage source through microswitch 46, through the coil, through the microswitch 50 and then to the negative side of the direct voltage source. Microswitch 46 also operates the relay R–3, the energization circuit for this relay being from the positive side of the direct voltage source, through the microswitch 46, and the coil of relay R–3 to the negative side of the direct voltage source. Relay R–2 is operated through the R–3 contact which is closed by operation of relay R–3, the energization circuit being from the positive side of the direct voltage source, through the contact of R–3 and the coil of relay R–2 to the negative side of the direct voltage source.

With the rotary valve and switch 92 in the proper position, the pump 28 brings an air sample into the lower chamber or compartment 12 of the air reservoir 10, the water normally therein being displaced into the upper compartment 14. When the water in the upper compartment reaches a desired level, the float arm 52 opens microswitch 46 which thereafter opens the circuits for relays R–1 and R–3. Opening of these switches stops the pump 28 and causes the rotary switch to advance one position, opening the valves for gas flow through the system. In this connection, it is to be again noted that the stepping relay which connects the paired thermistors of the particular reaction tube into the Wheatstone bridge circuit likewise opens the check valves 26, 44, normally isolating the sampling reservoir from the thermistor catalyst bed 34.

As the air flows through the reaction tube, the water falls from the upper compartment into the lower compartment. Very close to the end of the gas flow, the float arm actuates microswitch 48 which energizes the self-balancing Wheatstone bridge 110 and permits the meter 118 to indicate percent carbon monoxide. When the water has reached its lower level in the upper chamber or compartment 14, the float arm 52 actuates microswitch 50 which de-energizes the bridge 110, advances the rotary switch to a pumping position and starts the pump 28. Thereafter, a further cycle is instituted with a successive reaction tube 36 connected in the system.

In Figure 10 there is shown the results of a performance check on the indicator derived from tests conducted in the ventilation towers of the Holland Tunnel. During this test and by means of a recorder, the performance of the present indicator, illustrated by the full lines, was checked against a standard indicator, the performance of which is shown by the broken lines. The agreement between the two systems is very close with an average difference of plus or minus .002 percent carbon monoxide. However, it is to be noted that the intermittent sampling indicator responded more rapidly than the standard continuous sampling indicator, this being indicated by the solid trace showing changes in carbon monoxide concentration from one to two minutes earlier than the broken trace.

In the foregoing the invention has been described solely in connection with specific illustrative embodiments thereof. Since many variations and modifications of the invention will now be obvious to those skilled in the art, it is preferred to be bound not by the specific disclosures herein contained but only by the appended claims.

We claim:

1. An indicator for measuring carbon monoxide content in a sample of air comprising a gas reservoir having lower and upper compartments, said lower compartment being filled with water, electrically energized pump means in communication with said lower compartment for forcing a sample of air into said lower compartment to displace said water into said upper compartment, a reaction system adapted to be connected to said gas reservoir for receiving said sample, said reaction system including a thermistor-catalyst bed for oxidizing the carbon monoxide in said sample and for sensing the percent carbon monoxide as a decrease in thermistor resistance in dependence upon temperature rise brought about by oxidation, conditioning means interposed between said reservoir and said bed for reducing the relative humidity of said sample below a predetermined value, valve means normally isolating said reaction system from said gas reservoir, and control means including a float switch in said upper compartment for de-energizing said pump means and opening said valve means when the water in said upper chamber reaches a predetermined level.

2. An indicator according to claim 1 wherein said conditioning means includes a tube defining part of the flow path from said reservoir to said bed, and a glass wool fill in said tube moistened with a saturated solution of a salt chosen for the desired relative humidity.

3. An indicator according to claim 1 wherein said bed includes a pair of matched thermistors, one of said thermistors being arranged with the catalyst, and the other of said thermistors being arranged ahead of said catalyst and serving to compensate for changes in ambient temperature of said sample.

4. A thermometric indicator for measuring carbon monoxide content in a sample of air comprising a gas flow system feeding a catalyst-thermistor bank, means for periodically delivering samples of air to said catalyst-thermistor bank, said catalyst-thermistor bank including a first gas manifold connected to inlets of a plurality of reaction tubes, a second gas manifold connected to outlets of said same reaction tubes, said reaction tubes connected in parallel across said first and second gas manifolds, each of said reaction tubes including a chamber containing an oxidizing catalyst for thermometric detection of carbon monoxide in said sample, and a thermistor in said chamber for sensing temperature rises incident to oxidation of carbon monoxide in said sample.

5. An indicator for measuring carbon monoxide content in a sample of air comprising a gas reservoir having a water filled lower compartment and a water receiving upper compartment, a float displaceable upwardly in said upper compartment in response to the admission of air into said lower compartment, an electrically energized pump for forcing a sample of air into said lower compartment, an air flow system including a thermistor-catalyst bank comprising a first gas manifold connected to inlets of a plurality of reaction tubes, a second gas manifold connected to outlets of said same reaction tubes, said reaction tubes connected in parallel across said first and second gas manifolds, valve means individually isolating said reaction tubes from said reservoir and adapted to be opened in tandem sequence to bring successive reaction tubes into the flow path of said system, and control means operable in dependence upon the position of said float for intermittently de-energizing said pump means and for simultaneously opening successive ones of said valves.

6. An indicator for measuring carbon monoxide content in a sample of air comprising a gas reservoir having a water filled lower compartment and a water receiving upper compartment, a float displaceable upwardly in said upper compartment in response to the admission of air into said lower compartment, an electrically energized pump for forcing a sample of air into said lower compartment, an air flow system including a thermistor-catalyst bank comprising a first gas manifold connected to inlets of a plurality of reaction tubes, a second gas manifold connected to outlets of said same reaction tubes, said reaction tubes connected in parallel across said first and second gas manifolds, valve means individually isolating said reaction tubes from said reservoir and adapted to be opened in tandem sequence to bring successive reaction tubes into the flow path of said system, and control means operable in dependence upon the position of said float for intermittently de-energizing said pump means and for simultaneously opening successive ones of said valves, each of said reaction tubes including a sensing thermistor embedded in a catalyst, and a compensating thermistor in said flow path ahead of said catalyst for rendering the system independent of ambient temperature variations of said sample.

7. A thermometric indicator for measuring carbon monoxide content in a sample of air comprising a gas flow system feeding a catalyst-thermistor bank, means for periodically delivering samples of air to said catalyst-thermistor bank, said catalyst-thermistor bank including a first gas manifold connected to inlets of a plurality of reaction tubes, a second gas manifold connected to outlets of said same reaction tubes, said reaction tubes connected in parallel across said first and second gas manifolds, each of said reaction tubes including a chamber containing an oxidizing catalyst for thermometric detection of carbon monoxide in said sample, a thermistor in said chamber for sensing temperature rises incident to oxidation of carbon monoxide in said sample, another thermistor in said reaction tube ahead of said chamber compensating for changes in ambient temperature of said sample, and a bridge network for indicating carbon monoxide content independently of ambient temperature changes of said sample, said bridge network including said thermistors as first and second temperature responsive impedances, a third impedance variable to balance said bridge network, null seeking servo means connected in said bridge network for adjusting said third impedance to balance said bridge network, and an indicating instrument controlled by said null seeking servo means.

8. An indicator for measuring carbon monoxide content in a sample of air comprising means including a conduit for confining and driving said sample, an air flow system including a thermistor-catalyst bank including a first gas manifold connected to inlets of a plurality of reaction tubes, a second gas manifold connected to outlets of said same reaction tubes, said reaction tubes connected in parallel across said first and second gas manifolds, valve means individually isolating said reaction tubes from said conduit and adapted to be opened in sequence to bring successive reaction tubes into the flow path of said system, and control means operable for sequentially opening successive ones of said valves.

9. An indicator for measuring carbon monoxide content in a sample of air comprising a gas reservoir having a water filled lower compartment and a water receiving upper compartment, a float displaceable upwardly in said upper compartment in response to the admission of air into said lower compartment, an electrically energized pump for forcing a sample of air into said lower compartment, an air flow system including a thermistor-catalyst bank comprising a first gas manifold connected to inlets of a plurality of reaction tubes, a second gas manifold connected to outlets of said same reaction tubes, said reaction tubes connected in parallel across said first and second gas manifolds, valve means individually isolating said reaction tubes from said reservoir and adapted to be opened in sequence to bring successive reaction tubes in tandem sequence into the flow path of said system, and control means operable in dependence upon the position of said float for intermittently de-energizing said pump means and for simultaneously opening successive ones of said valves, each of said reaction tubes including a sensing thermistor embedded in a catalyst, and a compensating thermistor in said flow path ahead of said catalyst for rendering the system independent of ambient temperature variations of said sample, and a servo-controlled measuring bridge and indicator means including said successive sensing and compensating thermistors as ratio arms for evaluating thermistor resistance changes as percent carbon monoxide.

References Cited in the file of this patent

UNITED STATES PATENTS

| | | |
|---|---|---|
| 1,321,063 | Lamb et al. | Nov. 4, 1919 |
| 1,416,361 | Lamb et al. | May 16, 1922 |
| 1,638,104 | Roucka | Aug. 9, 1927 |
| 2,531,592 | Yant et al. | Nov. 28, 1950 |
| 2,551,281 | Moses et al. | May 1, 1951 |
| 2,631,088 | Guild | Mar. 10, 1953 |

FOREIGN PATENTS

| | | |
|---|---|---|
| 588,383 | Germany | Nov. 17, 1933 |
| 810,441 | Germany | Aug. 9, 1951 |
| 687,427 | Great Britain | Feb. 11, 1953 |

OTHER REFERENCES

Lamb et al.: "J. Am. Chem. Society," vol. 47 (1925), pages 123–142.

Altieri: "Gas Analysis," 1st edition, 1945, by the American Gas Assn. Inc., N. Y. C., pages 116–118.

Muller: "Analytical Chemistry," vol. 19, No. 4, April 1947, pages 29A, 30A.

Katz et al.: "Canadian Journal of Research," vol. 26, Sect. E–F, 1948, pages 318–330.

Larson et al.: "J. Am. Chem. Society," col. 44 (1922), pages 20–25.